(12) United States Patent
Kloft et al.

(10) Patent No.: US 10,982,992 B2
(45) Date of Patent: Apr. 20, 2021

(54) DEVICE AND METHOD FOR DETERMINING THE WEIGHT OF A HYDRAULIC ACCUMULATOR

(71) Applicant: HYDAC TECHNOLOGY GMBH, Sulzbach/Saar (DE)

(72) Inventors: Peter Kloft, Ransbach-Baumbach (DE); Herbert Baltes, Losheim (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 42 days.

(21) Appl. No.: 16/341,101

(22) PCT Filed: Sep. 4, 2017

(86) PCT No.: PCT/EP2017/001042
§ 371 (c)(1),
(2) Date: Apr. 11, 2019

(87) PCT Pub. No.: WO2018/068877
PCT Pub. Date: Apr. 19, 2018

(65) Prior Publication Data
US 2020/0182683 A1   Jun. 11, 2020

(30) Foreign Application Priority Data

Oct. 14, 2016   (DE) .................... 10 2016 012 621.3

(51) Int. Cl.
*G01G 17/04*   (2006.01)
*G01L 19/00*   (2006.01)
*G01L 9/00*   (2006.01)

(52) U.S. Cl.
CPC .......... *G01G 17/04* (2013.01); *G01L 19/0023* (2013.01); *G01L 9/006* (2013.01)

(58) Field of Classification Search
CPC ...... G01G 17/04; G01G 17/06; G01G 13/006; G01G 13/02; G01L 19/0023; G01L 9/006;
(Continued)

(56) References Cited

U.S. PATENT DOCUMENTS 4,063,605 A     12/1977 Graham
6,504,114 B1 *   1/2003 Lockery .............. G01G 3/1412
                                                    177/229

(Continued)

FOREIGN PATENT DOCUMENTS

DE      33 07 990     9/1983
DE      42 27 657     2/1994
(Continued)

OTHER PUBLICATIONS

International Search Report (ISR) dated Nov. 21, 2017 in International (PCT) Application No. PCT/EP2017/001042.

*Primary Examiner* — Robert R Raevis
(74) *Attorney, Agent, or Firm* — Wenderoth, Lind & Ponack, L.L.P.

(57) ABSTRACT

A device determines the weight of a hydraulic accumulator (10) during its operation in a hydraulic facility. A pressurised liquid is introduced into a pressure vessel at least partially filled with a gas. The pressurised liquid compresses the gas and is stored in such a way that when it leaves the accumulator (10) hydraulic energy is emitted to the facility. The respective current weight of the hydraulic accumulator (10) is detected by a weighing device (14) applied to the hydraulic accumulator (10).

18 Claims, 2 Drawing Sheets

(58) Field of Classification Search
CPC ........ G65B 3/28; F16L 55/052; F16L 55/053; F16L 55/054
USPC ................ 73/433, 1.73, 444, 149, 296, 865; 177/45, 50, 58, 132, 171, 172, 229, 245; 340/305; 141/1, 4; 137/206, 207, 209
See application file for complete search history.

(56) References Cited

U.S. PATENT DOCUMENTS

| | | | | |
|---|---|---|---|---|
| 2003/0221722 | A1* | 12/2003 | Hogsden | F16K 47/00 137/207 |
| 2015/0060155 | A1* | 3/2015 | Michaluk, III | G01G 23/01 177/25.12 |
| 2015/0151253 | A1* | 6/2015 | Gurfinkel | B01D 37/00 210/636 |
| 2016/0223377 | A1* | 8/2016 | Behrens | G01G 17/04 |
| 2016/0228837 | A1* | 8/2016 | Evans | B67C 11/04 |

FOREIGN PATENT DOCUMENTS

| | | |
|---|---|---|
| DE | 43 20 333 | 12/1994 |
| DE | 43 20 383 | 12/1994 |
| DE | 44 27 645 | 2/1996 |
| DE | 199 21 389 | 11/2000 |
| DE | 20 2015 002 465 | 6/2015 |
| GB | 2532321 | 8/2016 |

* cited by examiner

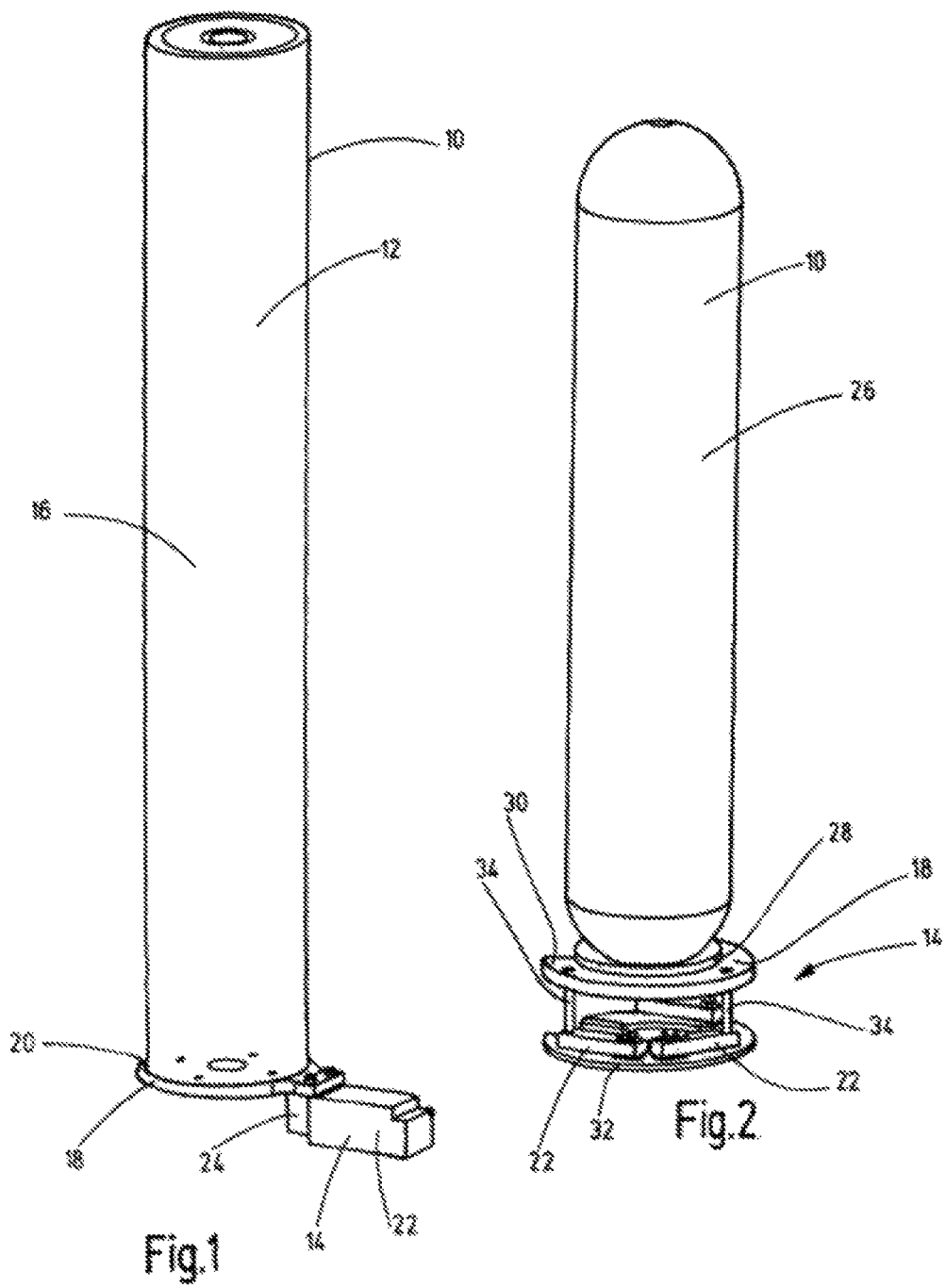

DEVICE AND METHOD FOR DETERMINING THE WEIGHT OF A HYDRAULIC ACCUMULATOR

FIELD OF THE INVENTION

The invention concerns a device for determining the weight of a hydraulic accumulator during operation within a hydraulic plant. A pressurized liquid is introduced into a pressure vessel that is partially filled with gas. The gas is compressed, and the liquid is stored under pressure, in such a way that, at the liquid discharge from the accumulator, hydraulic energy is released to the plant. The weight of the hydraulic accumulator is determined by a weighing device that engages with the hydraulic accumulator. The invention concerns, moreover, a method for implementing the determination of the weight, preferably by application of such a device.

BACKGROUND OF THE INVENTION

With hydropneumatic accumulators or hydraulic accumulators it has so far been necessary to check the pressure level of the gas required for the correct operation of such accumulators at certain time intervals since, depending on the operating mode of the respective hydraulic accumulator, gas losses are likely to occur. To this end it is possible to fully release the pressure from the hydraulic plant on the liquid side or oil side, at least from that part of the plant to which the hydraulic accumulator is connected, to be able to check, in that pressure-free state, the pre-load pressure of the gas inside the hydraulic accumulator, often in form of nitrogen gas, and to replenish any missing quantities on the gas-side of the accumulator if necessary. This process is, however, time-consuming, and the hydraulic accumulator plant is not operational for the duration of the test.

To overcome these disadvantages, DE 43 20 383 C2 discloses a device for measuring the actual gas pre-load pressure of a gas in a hydropneumatic accumulator, which provides a gas connection between the accumulator and a measuring chamber that is a fraction of the size of the accumulator volume. The measuring chamber may be shut off. A measuring sensor is disposed between the accumulator and the shut-off device, permits measuring the gas pressure inside the accumulator when the connection is shut off and measures the resulting change in pressure when the connection is opened. The actual gas pre-load pressure may then be calculated from the pair of measuring values obtained in this manner. This arrangement allows determining the actual gas pre-load pressure using a simple design and a single measuring process, which in turn allows for a judgement concerning the operational state of the accumulator. If the actual gas pre-load pressure that was determined through the measurement is either less or greater with respect to a target gas pre-load pressure, the accumulator has to be charged or discharged respectively at its gas end with a predeterminable quantity of gas via a corresponding dosing device to ensure the operational reliability of the hydraulic accumulator. However, since in the known solution the operating gas or stored gas in the hydraulic accumulator necessarily expands when flowing into the connected measuring chamber for a measuring operation, temperature differences occur between the stored gas and the gas to be measured, which has a negative effect on the measuring quality.

DE 42 27 657 A1 discloses an ultrasonic measuring device for a hydraulic accumulator in form of a piston accumulator, which serves to ascertain the predeterminable target position of the piston that is displaceable inside the accumulator housing. The piston serves as the separating element between the gas side and the liquid side of the accumulator. The piston is provided with at least one measuring element that is detectable by the measuring device. A visible marker is assigned to the measuring element that indicates the target position of the piston on the outside of the accumulator housing. With respect to the accumulator housing marker, an ultrasonic measuring device, which is provided for the respective measuring element on the piston, may be placed onto the accumulator or pressure vessel housing, which permits measuring a plurality of different accumulators of a certain size. The markings with a single measuring device limit the instrumentation requirements for the measurements.

Since the position of the piston inside the piston accumulator can be equated with a certain, predeterminable filling volume at the gas side of the hydraulic accumulator, it is possible to check a plurality of accumulators concerning compliance with a predeterminable target gas pressure by using a single, hand-held unit as measuring device. The target gas pressure corresponds to the original gas pre-load pressure of the accumulator when it was first supplied or taken into operation. If the actual gas pressure value deviates from the target value, that is, the actual value is less than the target value, the separating piston of the piston accumulator is displaced towards the reduced gas volume due to the increased amount of liquid streaming in, placing the piston outside the marker. This displacement is detected by the ultrasonic measuring device and thereby provides the opportunity to replenish the accumulator at its gas side until the piston is back in its predeterminable target position that is indicated by the respective marker so that the full functionality of the hydraulic accumulator is restored again in this manner.

Since the above-described measuring device must be operated manually, and possibly a large number of hydraulic accumulators may need to be checked, this causes a significant manual measuring effort, reflected in high expenses.

SUMMARY OF THE INVENTION

Based upon this prior art, an object of the invention to provide an improved device and method able to ascertain the functional reliability of a hydraulic accumulator at a small effort and free of measuring errors.

The object is basically met by a device as well as a method where the weight of the hydraulic accumulator is measured, preferably continuously, even while in operation inside a hydraulic plant to which it is connected, by a separate weighing device that engages with the respective hydraulic accumulator. The weighing device that engages with the respective hydraulic accumulator constantly or permanently may at the beginning, when the hydraulic accumulator is not charged with a liquid, such as a hydraulic medium for example, or is only partially charged, determine its empty weight. Once the empty weight of the respective hydraulic accumulator of a certain volume class has been determined, it is known from prior measurements or from practical experience how much liquid such an accumulator is able to take up so that it can be pre-loaded with a predeterminable gas pressure at the gas side of the hydraulic accumulator to be able to fulfill its function reliably. When considering this liquid volume determination, it is also feasible to utilize a reference hydraulic accumulator with a functional "operating weight" that is known. If the hydraulic accumulator is now in operation in the plant to which it is connected, it will, in the long run at least, lose gas from the gas side towards the liquid side, for example due to permeation or other leakage of the respective separating element that separates the gas side from the liquid side. The consequence of this leakage is that the actual gas pre-load pressure drops below the target pressure, which pressure drop causes more liquid to enter into the accumulator. The weighing device connected to the hydraulic accumulator senses the increased liquid immediately. If any predeterminable, intolerable mass limits are exceeded, the respective hydraulic accumulator will have to be replaced altogether, or its gas side has to be replenished as part of the maintenance process.

Due to the possibility of a continuous weight measurement of the accumulator, it is possible to recognize developing trends, which make it possible to determine at what stage the functional reliability of the hydraulic accumulator is no longer provided. In extreme instances, the separating element of the hydraulic accumulator, which often is provided in form of an elastomeric membrane or an accumulator bladder, could rip, or the separating piston could start leaking around the circumference. The result of a failure of this kind would be that the hydraulic accumulator loses its entire volume of gas in the direction of the liquid side, and the liquid starts to completely fill the pressure vessel or the accumulator housing during operation of the accumulator. This complete filling is something that the weighing device senses immediately and reliably due to the rapidly increasing weight of the accumulator due to the weight of the liquid. In particular, hydraulic accumulators that are used for emergency functions in plants used for example in nuclear power stations, it is in this way possible to monitor the required functional reliability over longer operating periods by the weighing device. This monitoring constitutes an important gain in reliability.

To achieve particularly accurate measurements, the weighing device may be connected to a higher-level electronic control and monitoring unit, which also receives pressure and/or temperature inputs, so that, based on the usual gas equations of state, the determined weights can be recalculated to exactly the liquid and gas volumes introduced into the respective hydraulic accumulator. Since the hydraulic accumulator constitutes a closed system, it is sufficient to regularly sense the pressure and/or temperature values at the liquid side of the accumulator since, at least in the long term operation of the accumulator. The pressure and/or temperature values on the gas side of the accumulator adapt necessarily to those on the liquid side.

The invention, moreover, concerns a method for implementing a weight measurement on a hydraulic accumulator, preferably by using the device according to the invention, to determine the respective current gas volume on the gas side of the pressure vessel. Based upon a reference value as target value, the respective gas volume is determined as actual value, which becomes less if at a certain operating state of the hydraulic accumulator when the volume of the liquid on the liquid side of the pressure vessel unintentionally increases.

Using such a weight measurement method, it is also possible to perform a piston position measurement in a piston accumulator so as to draw indirect conclusions from the measured position of the piston to the remaining gas volume of the hydraulic accumulator during operation.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are schematic and not to scale:

FIGS. 1 & 2 are perspective views of a piston accumulator and a bladder accumulator, respectively, including an associated weighing device, according to first and second exemplary embodiments, respectively, of the invention.

DETAILED DESCRIPTION OF THE INVENTION

Figure 3:
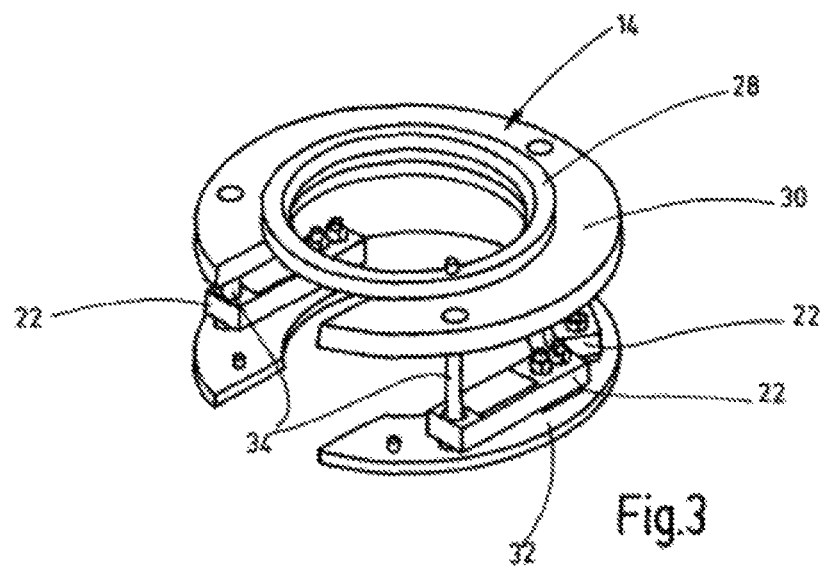
FIGS. 3 & 4 are a perspective view and side view, respectively, of the weighing device used for a bladder accumulator according to FIG. 2.

FIG. 1 depicts a device for determining the weight of a hydraulic accumulator 10 in form of a piston accumulator 12 in which the respective actual weight of the accumulator 10, 12 is ascertained by a weighing device 14 that engages with the hydraulic accumulator 10.

Such hydraulic accumulators are also called hydropneumatic accumulators or simply accumulators in the industry. The basic purpose of such hydraulic accumulators is to store a liquid, in particular in form of a hydraulic medium, under pressure inside the accumulator. When discharging the liquid inside the accumulator under the pressure of the pre-loaded gas into the hydraulic circuit of a hydraulic plant, the stored hydraulic energy can be released. To this end the respective hydraulic accumulator 10 is usually connected at its lower end through tubes (not shown in detail in FIGS. 1 and 2) to a hydraulic circuit or a hydraulic plant (not shown). The pressure of the liquid in the accumulator compresses a gas, usually in form of nitrogen, inside the hydraulic accumulator. After the volume discharge described above, the accumulator gas expands and the pressure at the gas side is reduced. The gas stored inside the hydraulic accumulator and the hydraulic liquid are usually separated from each other by a separating element, which is preferably sealed against media leakage. Different separating elements are used depending on the design of the accumulator. A membrane accumulator uses a membrane as separating element. A bladder accumulator has an elastomer bladder separating member. A piston accumulator has a piston separating member. A bellows-type accumulator has a metal bellows as separating member or separating element. The object of the separating member or separating element is to provide a separation between gas and liquid over a prolonged operating period of the respective hydraulic accumulator. The loss of gas via the separating element into the liquid side of the accumulator can basically not be avoided.

The actual loss of gas essentially depends on the type of elastomer used for the separating membrane or the accumulator bladder, as well as the liquid used and the molecule size of the accumulator gas. Further influencing variables are predetermined by the choice of material and the thickness of the separating element. The pressure differences during operation of the hydraulic accumulator between gas and liquid side as well as the number of load cycles in operation and the operating temperature of the hydraulic accumulator also play a significant role. Piston accumulators can generally lose gas from the gas side of the piston accumulator to its liquid side via the sealing system of the separating piston, which is guided along the inner circumference of the accumulator housing or pressure housing. The above-mentioned metal bellows accumulators, which are another kind of hydraulic accumulators, are on the other hand virtually gas-tight and have no permeation since the bellows-shaped metal membranes commonly used in them do not let any gas through, even at high temperatures. Only in the instance of failure, that is, when the metal bellows rips, that accumulator also loses its ability to function, which also applies for failures of the separating element of membrane accumulators, bladder accumulators and piston accumulators.

The equations for the change of state of gases are used for sizing of the respective hydraulic accumulator. Nitrogen is commonly used as accumulator gas for hydraulic accumulators. When calculating and sizing accumulators, the ideal change of state in gases is often used. At very high pressures, the respective real gas characteristics must be taken into consideration. Moreover, iterative computations are used under consideration of measured values for pressure change, temperature change and volume change.

As already explained, the functionality of the respective hydraulic accumulator is diminished if, due to losses, there is insufficient accumulator gas present in the gas side that is under a predeterminable pressure inside the accumulator 10. In this instance the liquid side of the hydraulic accumulator 10 necessarily takes up more liquid, which can easily be measured via the weighing device 14 for the hydraulic accumulator 10.

It is therefore possible, for example, to determine the empty weight by the weighing device 14 prior to taking the hydraulic accumulator 10 into service. Based upon reference values of known, functional accumulators, it is possible to set the ideal liquid filling volume inside the hydraulic accumulator 10, the weight of which is detected by the weighing device 14. It is therefore known very accurately what the weight of a hydraulic accumulator 10 of a certain type and size in service should be to be operational. In the instance that the gas volume in the gas side decreases unintentionally during operation of the accumulator, the volume of the liquid in the liquid side increases correspondingly, depending on the operating cycle. The resulting increase in mass or weight is registered by the weighing device 14. As soon as any predeterminable limit values are exceeded, the hydraulic accumulator 10 is recognized as being diminished in functionality or as inoperative with the result that the gas in the gas side is replenished at a predeterminable pressure, or it is replaced by a new accumulator.

Since the weighing device 14 is permanently attached to the hydraulic accumulator 10 and takes measurements continuously, it is possible to register trends via an evaluation and diagnosis unit (not shown in detail) and so determine for how long the accumulator may be functionally reliable. If the respective separating element fails, in this instance in form of a separating piston for the piston accumulator 12, the weighing device 14 detects this immediately since the entire hydraulic accumulator 10 fills up rapidly with liquid. The rapidly rising liquid inrush is interpreted by the weighing device 14 together with the connected electronic evaluation unit as a failure of the hydraulic accumulator 10. It particularly is sensible to use such weighing devices 14 for those hydraulic accumulators 10 in machine components that are used, for example, in the power generation sector, if they are to ensure their reliability in the instance of failure by providing their function also in a breakdown situation.

By determining the state of the liquid and gas volumes through the weighing device 14, it is indirectly also possible to establish the piston position inside the accumulator housing of the piston accumulator 12, which in turn gives an indication regarding the desired unrestricted movement of the piston as separating element inside the accumulator housing 16.

The tube connections (not shown) of the hydraulic plant to which the hydraulic accumulators 10 with their liquid side are commonly connected at their bottom end have only a very indirect negative effect on the weight measurement by the weighing device 14 since the tubing is necessarily flexible and their influence on the weight can be compensated for by the electronic evaluation unit to which the weighing device 14 is connected. Erroneous measurements due to respective operating conditions of the hydraulic accumulator 10 are therefore excluded.

According to the representation in FIG. 1 the weighing device 14 is provided with a circular seat 18, which tightly encloses the bottom end 20 of the housing 16 of the hydraulic accumulator 10 so that the pressure vessel of the hydraulic accumulator 10 can be placed with its bottom end onto the seat 18 and is retained there. The seat 18 therefore supports the piston accumulator 12 in the manner of a weighing pan. The seat 18 is part of the weighing device 14. The associated measuring facility comprises a load cell 22 with a bending beam 24 and at least one strain gauge (not shown) that is attached thereto. Load cells 22 of this kind are also called platform load cells in the industry. They may, for example, be purchased under the trading name PW12C . . . from the German company Hottinger Baldwin Messtechnik GmbH. The respective load cell 22 may also be designed as a double bending beam made from a metallic material, such as aluminum, with a preferably rectangular cross-section. Moreover, that measuring facility may also be connected to a signal amplifier of the electronic evaluation unit in order to visualize the measuring results. A suitable signal amplifier, for example DAD141.1, may be purchased from the company Soemer.

The annular seat 18 has a solid metal ring, which allows the tube connections (not shown) at the liquid side of the piston accumulator 12 to pass through the ring. According to the representation in FIG. 1, moreover, the respective collar in form of the seat 18 is, together with the associated components for mounting the piston accumulator 12, mounted to the seat 18 at the upper end of the respective load cell 22.

A weight measurement for a bladder accumulator 26 of a commonly used design is depicted in the embodiment according to FIG. 2. Through consideration of reference values for comparable bladder accumulators, and preferably based upon the determination of the weight when empty by the weighing device 14, it is now for the first time possible for a bladder accumulator 26 to ascertain a value for the fill level of the accumulator on the gas side in order to obtain an indication concerning the functionality and functional reliability of the bladder accumulator 26.

To this end the bladder accumulator 26 is inserted with its bottom end into a support ring 28, which is part of the already described seat 18. As is shown in particular in FIG. 3, the depicted support ring 28 is closed and is disposed at the upper side onto a slotted attachment ring 30, which is also part of the seat 18, and thus, part of the weighing device 14. An equipment ring 32, which has a slot that corresponds to the attachment ring 30, extends coaxial to the support ring 28 and the attachment ring 30 below both those rings 28, 30. The equipment ring 32 is also part of the weighing device 14 as a whole, and with it the weighing device 14 can be stood on a floor or other surface together with the bladder accumulator 26. Three load cells 22 are disposed and firmly attached on the upper annular ring surface of the equipment ring 32. The load cells 22 carry at their top side a sensing column 34 with each engaging at their free upper ends on the underside of the attachment ring 30.

Figure 4:
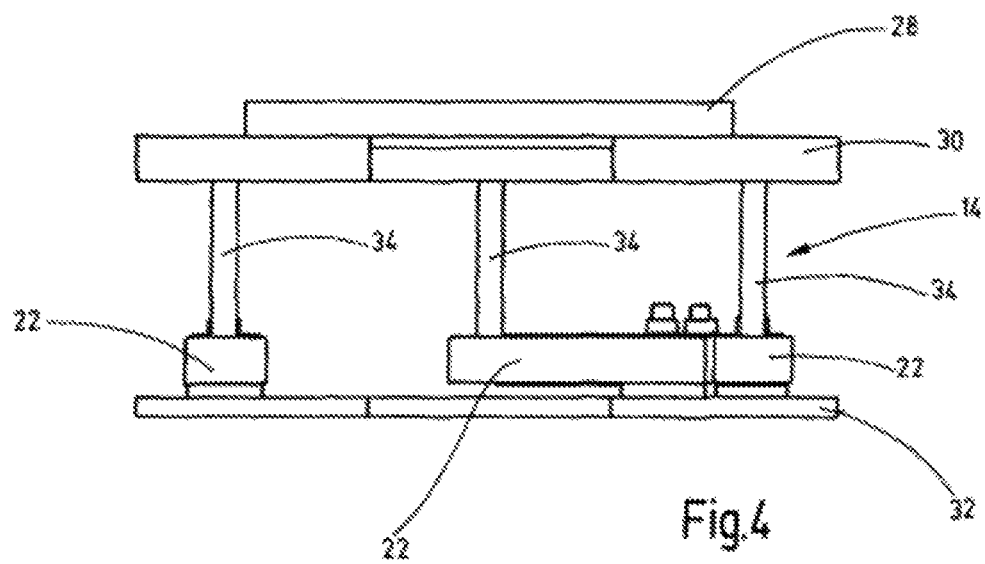

The load cell 22 according to the embodiment in FIGS. 2 to 4 may be purchased under the product name K2A at the German company Wagetechnik Kohn GmbH. That load cell K2A is part of the series of double bending beam load cells that have an aluminum housing of a rectangular cross-section. The above-mentioned strain gauges are disposed on the upper and lower side. To this extent the sensing columns 34 are in operative connection with the upper strain gauge DMS of the load cell K2A.

With the combination of components depicted in FIGS. 3 and 4, a weighing device 14 is provided as a measuring facility, which permits the acquisition of measurements concerning weight or mass respectively at any stage of fill level of hydraulic accumulators 10, such as, for example, the bladder accumulator 26 shown in FIG. 2. The load cells 22 described above have proven to be particularly suitable so that conclusions may be drawn, indirectly via the weight measurement of the hydraulic accumulator 10, to its current gas charging state. This structure has no equivalent in the prior art.

While various embodiments have been chosen to illustrate the invention, it will be understood by those skilled in the art that various changes and modifications can be made therein without departing from the scope of the invention as defined in the claims.

The invention claimed is:

1. A hydraulic accumulator, comprising:
a pressure vessel having a gas chamber at partially filled with a process gas and having a liquid chamber with pressurized liquid stored therein and pressurized by the process gas in the gas chamber, the pressurized liquid being dischargeable from the pressure vessel as hydraulic energy into a hydraulic plant; and
a weighing device contacting the pressure vessel and capable of determining current weights of the pressure vessel during operation thereof, the weighing device having a seat receiving and at least partially surrounding a bottom end of the process vessel, the seat interacting with a measuring facility of the weighing device, the measuring facility including a first load cell with a bending beam and at least one strain gauge disposed on the bending beam.

2. A hydraulic accumulator according to claim 1 wherein the measuring facility is connected to a signal amplifier allowing visualizing of a measuring result thereof.

3. A hydraulic accumulator according to claim 1 wherein the first load cell comprises a double bending beam of metal.

4. A hydraulic accumulator according to claim 3 wherein the double bending beam has a rectangular cross-section.

5. A hydraulic accumulator according to claim 1 wherein the seat comprises a collar disposed on an upper side of the first load cell supporting the pressure vessel.

6. A hydraulic accumulator according to claim 1 wherein the measuring facility includes second and third load cells; and
the seat comprises a support ring on which the bottom end of the pressure vessel rests and engages an opening of the support ring, the support ring being supported by first, second and third sensing columns disposed at distances from one another, the first, second and third sensing columns standing on the first, second and third load cells, respectively, the first, second and third load cells being braced at bottoms thereof and being fixedly attached to an equipment ring.

7. A hydraulic accumulator according to claim 6 wherein the opening of the support ring provides a passage capable of providing a passage through which liquid-conducting tubes connected to the pressure vessel on a side of the liquid chamber are capable of extending.

8. A method for monitoring and maintaining a gas amount at a gas side of a hydraulic accumulator, comprising the steps of:
determining an empty weight of the hydraulic accumulator while empty and not in operation;
predetermining a value of an ideal filled accumulator weight based on a sum of the empty weight of the hydraulic accumulator and a weight of an ideal liquid filling amount inside a liquid chamber in the hydraulic accumulator for functionally reliable operation of the hydraulic accumulator;
measuring an actual weight of the hydraulic accumulator during operation by a weighing device contacting the hydraulic accumulator during operation of the hydraulic accumulator;
detecting a weight increase of an actual liquid filling amount in the liquid chamber of the hydraulic accumulator during operation of the hydraulic accumulator by comparing the actual weight of the hydraulic accumulator with the ideal filled accumulator weight while a gas volume in a gas chamber of the hydraulic accumulator decreases unintentionally;
detecting that the hydraulic accumulator is functionally impaired or inoperative based on the detecting of the weight increase of the actual liquid filling amount; and
replenishing the gas volume in the gas chamber to a predetermined pressure or replacing the hydraulic accumulator with another hydraulic accumulator upon detecting that the hydraulic accumulator in operation is functionally impaired or inoperative.

9. A method according to claim 8 wherein
the determinate and monitoring of the actual filling amount is performed continuously.

10. A method according to claim 8 wherein
the gas volume in the gas chamber is determined by measuring the actual liquid filling amount in the liquid chamber during operation of the hydraulic accumulator.

11. A method according to claim 8 wherein
a position of a piston in the hydraulic accumulator between the gas chamber and the liquid chamber is determined by measuring the actual liquid filling amount in the liquid chamber during operation of the hydraulic accumulator.

12. A method according to claim 8 wherein
the hydraulic accumulator comprises a pressure vessel having a gas chamber at least partially filled with a process gas and having a liquid chamber with pressurized liquid stored therein and pressurized by the process gas in the gas chamber, the pressurized liquid being dischargeable from the pressure vessel as hydraulic energy into a hydraulic plant; and
the weighing device contacts the pressure vessel and determines current weights of the pressure vessel during operation thereof, the weighing device having a seat receiving and at least partially surrounding a bottom end of the process vessel, the seat interacting with a measuring facility of the weighing device, the measuring facility including a first load cell with a bending beam and at least one strain gauge disposed on the bending beam.

13. A method according to claim 12 wherein
the measuring facility is connected to a signal amplifier allowing visualizing of a measuring result thereof.

14. A method according to claim 12 wherein the first load cell comprises a double bending beam of metal.

15. A method according to claim 14 wherein the double bending beam has a rectangular cross-section.

16. A method according to claim 12 wherein the seat comprises a collar is disposed on an upper side of the first load cell supporting the pressure vessel.

17. A method according to claim 12 wherein the measuring facility includes second and third load cells; and
the seat comprises a support ring on which the bottom end of the pressure vessel rests and engages an opening of the support ring, the support ring being supported by first, second and third sensing columns disposed at distances from one another, the first, second and third sensing columns standing on the first, second and third load cells, respectively, the first, second and third load cells being braced at bottoms thereof and being fixedly attached to an equipment ring.

18. A method according to claim 17 wherein the opening of the support ring provides a passage capable of providing a passage through which liquid-conducting tubes connected to the pressure vessel on a side of the liquid chamber are capable of extending.

* * * * *